United States Patent [19]

Gaither et al.

[11] Patent Number: 4,599,921

[45] Date of Patent: Jul. 15, 1986

[54] METHOD AND APPARATUS FOR MACHINING A WORKPIECE

[75] Inventors: Paul I. Gaither, Friendswood; Joseph R. Tucker, III, Pasadena, both of Tex.

[73] Assignee: Reed Tool Company, Houston, Tex.

[21] Appl. No.: 676,244

[22] Filed: Nov. 29, 1984

[51] Int. Cl.⁴ .......................... B23B 1/00; B23B 33/00
[52] U.S. Cl. ..................... 82/1 C; 82/40 R; 76/108 A; 269/272
[58] Field of Search .......................... 82/1 C, 45, 40 R; 76/108 A, 108 R; 269/272, 283; 279/4

[56] References Cited

FOREIGN PATENT DOCUMENTS 612826 11/1948 United Kingdom ............... 82/40 R

*Primary Examiner*—Leonidas Vlachos
*Attorney, Agent, or Firm*—Vinson & Elkins

[57] ABSTRACT

A method and apparatus for machining on a rotary lathe (L) the bearing journal (14) of an elongate rotary drill bit body section or so-called lug (W). A workpiece holder (H) adapted to be removed from and positioned on the lathe (L) grips the bit body section (W) in a predetermined position. The holder (H) with the drill bit body section (W) is inserted loosely within an inclined pocket (O) on the lathe (L) defined by parallel upper and lower planar surfaces (74, 76). Positioning pins (86) on the lathe (L) engage the lower surface of the holder (H) and move the holder (H) against the upper planar surface (74) of the pocket (O) for the machining operation. After the machining operation on the bearing journal is completed, holder (H) is released by the positioning pins (86) and the holder (h) with the finished bit body section then removed from the lathe (L).

8 Claims, 9 Drawing Figures

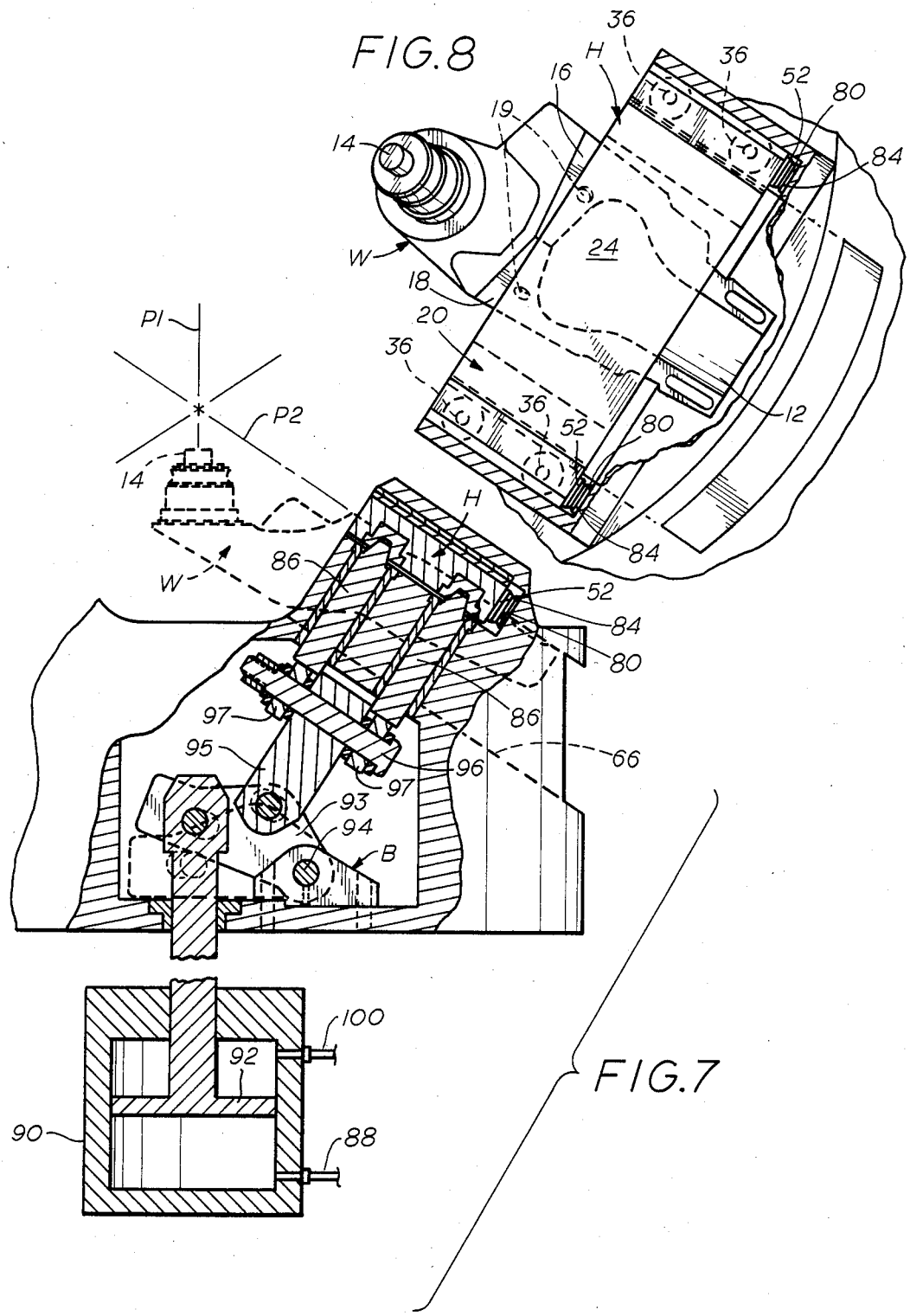

METHOD AND APPARATUS FOR MACHINING A WORKPIECE

BACKGROUND OF THE INVENTION

This invention relates to a method and apparatus for machining a workpiece, and more particularly to a method and apparatus for machining on a lathe the bearing journal of a rotary drill bit body section or so-called lug.

A rotary drill bit is normally formed of three elongated body sections or lugs which are welded together to form the completed bit body as illustrated generally in U.S. Pat. No. 4,414,734 dated Nov. 15, 1983. Each bit body section has a bearing journal adjacent one end thereof to mount a rotatable roller cutter thereon, and a shank or leg extending from the bearing journal as shown generally in U.S. Pat. No. 4,410,284 dated Oct. 18, 1983. The leg has two so-called one hundred twenty degrees (120°) faces which serve as reference planes for the machining of the bearing journal. Precise machining of the bearing journal is crucial to the useful life of the bearing assembly for the roller cutter, and thus to the overall life of the drill bit.

Heretofore, the fixture or holder for positioning and clamping of a drill bit body section or lug for machining the journal has utilized a pair of gripping jaws fixedly positioned on a rotary lathe. The positioning of the bit body section within such jaws on the lathe was time consuming particularly since a very high degree of accuracy is involved, and oftentimes resulted in a scrapping of a machined body section due to inaccurate alignment during machining operations. All of this is, of course, uneconomical as well as time consuming. In addition, the body section which may weigh fifty (50) pounds or more, could be a safety hazard to a machine operator when loading the bit body section into the turning lathe, as well as in removing the finished body section from the lathe.

Various types of fixtures or holders for rotary drill bit sections or lugs are also shown in U.S. Pat. No. 3,907,191 dated Sept. 23, 1975, and U.S. Pat. No. 4,054,772 dated Oct. 18, 1977.

SUMMARY OF THE INVENTION

The present invention is directed particularly to a method and apparatus for machining a workpiece particularly a bearing journal on a rotary drill bit body section, and a machining or metal working apparatus, such as a rotary lathe, in which the fixture or holder for the drill bit body section is easily positioned on and removed. Thus, the drill bit body section or workpiece may be positioned within the holder or fixture at a location removed from the metal working apparatus thereby eliminating a possible safety hazard. The removable holder includes two interfitting body portions with the elongate shank or leg of the drill bit body section being gripped at a predetermined position between the two body portions.

Heretofore, there has been a possible safety hazard involved with a lathe operator having to clamp the drill bit body section within the lathe. By the present method, a lifting eye on the removable holder is engaged by a hook on an overhead lift mechanism, for easy positioning and removal of the holder and workpiece. First the bit body section is placed between the two interfitting body portions of the holder at a position remote from the lathe and tightly gripped at a predetermined position. Then, the holder with the body section therein is lifted by the lathe operator and transported to the lathe, where it is slid into position within an inclined pocket of the lathe. The pocket has downwardly inclined upper and lower planar surfaces leading from the receiving opening so gravity aids the operator in sliding the holder down the inclined pocket for positioning. The holder and bit body section are initially supported after insertion in the pocket on the lower planar surface of the pocket but subsequently are pressed against the upper planar surface for the reasons set forth in the following paragraph.

It is common in lathe operations for foreign matter, particularly metal turnings, to be deposited or thrown within openings or grooves in a lathe, and a very common occurrence is the depositing of such turnings on a supporting surface. To avoid this situation, the present invention includes positioning and supporting means for the holder that engage the holder after initial insertion within the pocket to move the holder upwardly in the pocket into tight contact with the upper planar surface, which forms a reference plane for the turning operation. Since it is unlikely that any foreign matter would be deposited on or adhere to such planar upper surface, an accurate positioning of the holder and workpiece is provided for the machining operation, thereby minimizing the alignment problems so frequently encountered in such lathe operations which result in excessive scrap material or rework of workpieces.

The holder comprising the present invention is also easily adapted for utilization with robotics and a robot could easily lift and position the holder and workpiece within the pocket, then easily remove the workpiece and holder after the machining operation is completed. The use of a robot would further reduce operator contact and safety hazards encountered by the lathe operator being in close engagement or contact with the holder and lathe.

Another important feature of the invention is in the holder itself, which is adapted to be inserted within the inclined pocket on the lathe. The holder comprises two body portions which interfit to grip the workpiece therebetween. The upper body portion which is adjacent the machining tool during machining has contact faces thereon arranged at a precise angular relation to each other for accurately positioning the workpiece, and the lower body portion interfits with the upper body portion in a tight gripping relation to the workpiece. The body portions of the holder have openings which are aligned for receiving pins to hold the body portions in interfitting relation about the workpiece when the body portions are accurately positioned. The upper body portion has supporting ledges for supporting the holder and workpiece when the holder is initially inserted within the pocket of the lathe, and the lower body portion fits between the supporting ledges of the holder.

The present invention is particularly adaptable for use with a rotary drill bit body portion for accurately machining the bearing journal of the bit body section. However, this invention would have utility with other types of workpieces and many of the features of this invention would be suitable with use for other workpieces.

It is an object of the present invention to provide for a machining apparatus a separate workpiece holder which is easily positioned on and removed from the machining apparatus so that a workpiece held by the holder may be machined.

Another object is to provide such a separate holder that is easily insertable within a receiving pocket of a rotary turning lathe, and is then secured within the pocket at a predetermined precise position for the machining operation so that the holder and machined workpiece may be easily removed from the lathe and the holder disassembled for removal of the completed workpiece.

A further object of this invention is to provide an apparatus for machining on a bearing journal on an elongated drill bit body section which has means to receive and position precisely a separate holder removable from the machining apparatus with the holder tightly gripping the bit body section so that the bearing journal is positioned precisely for the machining operation.

Additionally, a further object is to provide a method for machining a workpiece in a lathe including the steps of first positioning a workpiece within a holder removed from the lathe with the workpiece gripped accurately at a predetermined position, and then releasably securing the holder and workpiece tightly on the lathe at a precise predetermined position for machining the workpiece accurately with a minimum of scrap and rework.

Other and more detailed objects and advantages of this invention will appear from the following description and the accompanying drawings, wherein:

FIG. 1 is a fragmentary view of a rotary lathe showing a workpiece held by a holder in aligned position on the rotary table for machining by a suitable metal cutting tool on the lathe;

FIG. 1-A is a side elevation of the holder and gripped workpiece removed from the lathe shown in FIG. 1;

FIG. 7 is a fragmentary view, partly in section, showing the means for urging and holding the holder and workpiece into the aligned position within the lathe as shown in FIG. 6; and FIG. 8 is a top plan fragmentary view of the holder and workpiece in position within the lathe.

Figures 1, 1A:
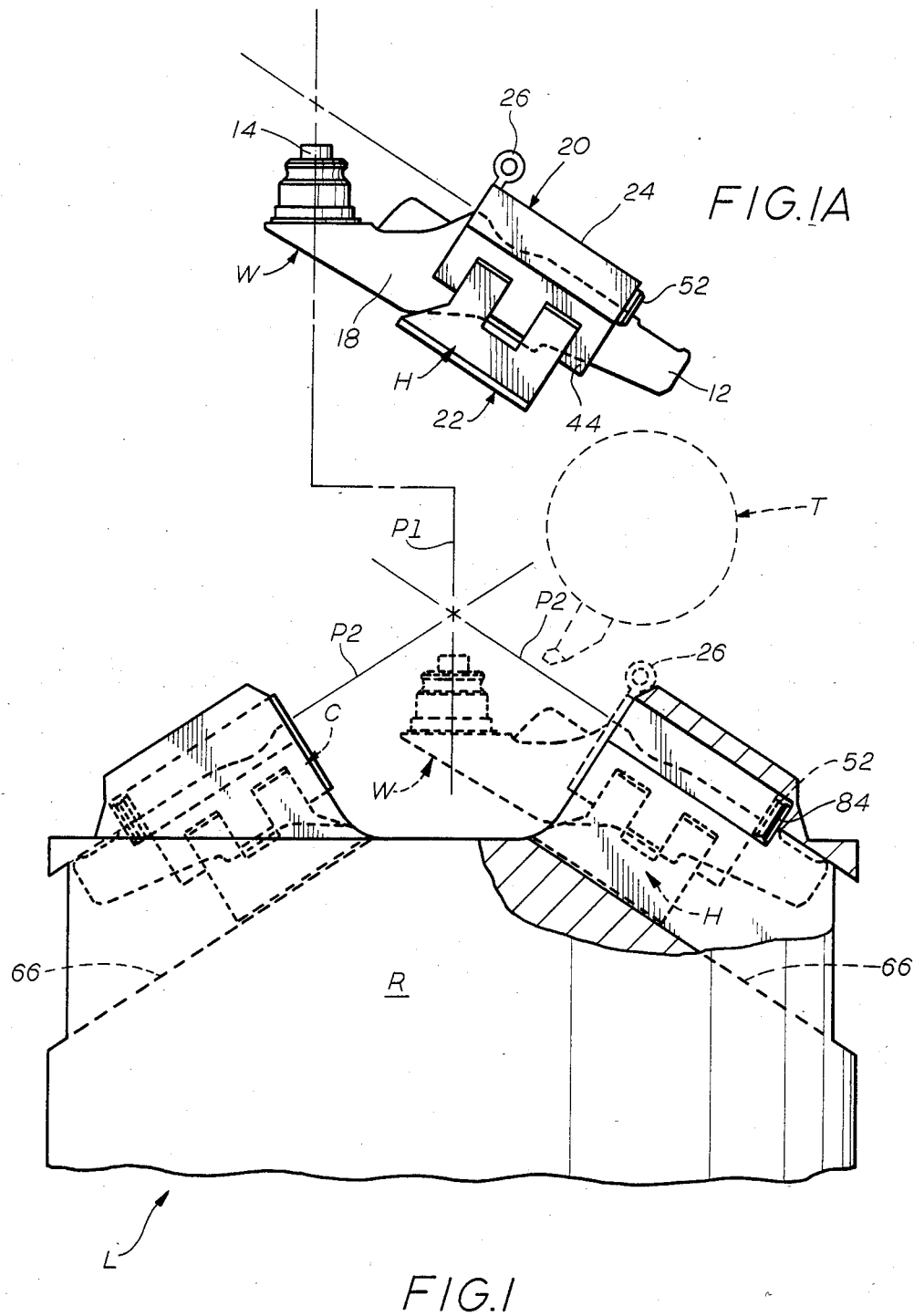
Figure 2:
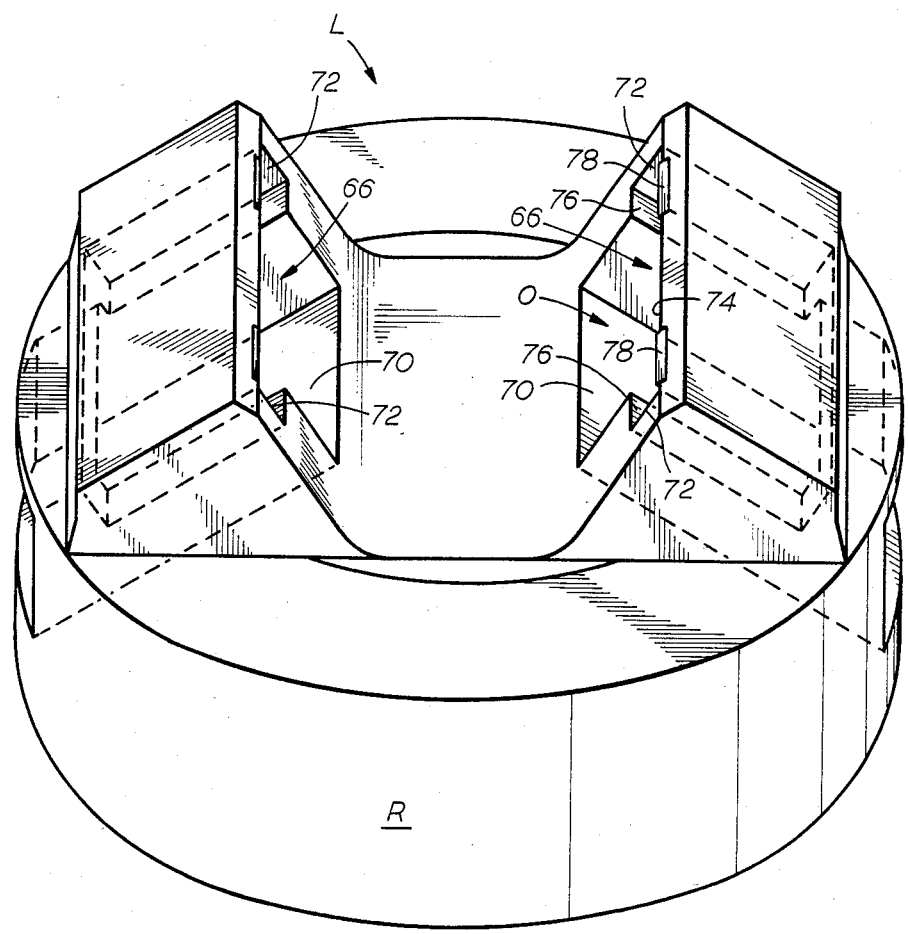
FIG. 2 is a perspective of the rotary table of the lathe showing the receiving opening or pocket in which the holder and associated workpiece is inserted for the machining operation.

Referring now to the drawings for a better understanding of our invention, reference is made particularly to FIGS. 1 and 2 in which a lathe is generally designated L having a rotary table R to support a workpiece generally designated W, and a cutting tool T for machining workpiece W. It is necessary that workpieces be accurately positioned on a lathe with respect to the cutting tool in order to machine properly and precisely the workpiece. As noted in FIG. 1, certain reference points or planes are utilized in order to provide a precise alignment for the machining operation. Workpiece W is positioned within a removable holder generally designated H which may be easily positioned on and removed from lathe L. Reference points or planes are illustrated in FIG. 1 with the vertical centerline of rotary table R at P1 and reference plane P2 formed by an upper planar surface defining receiving opening or pocket O shown in FIG. 2 as will be explained further below. In the position shown in FIG. 1, holder H and workpiece W are precisely positioned on lathe L for the working or cutting operation by cutting tool T.

Figure 3:
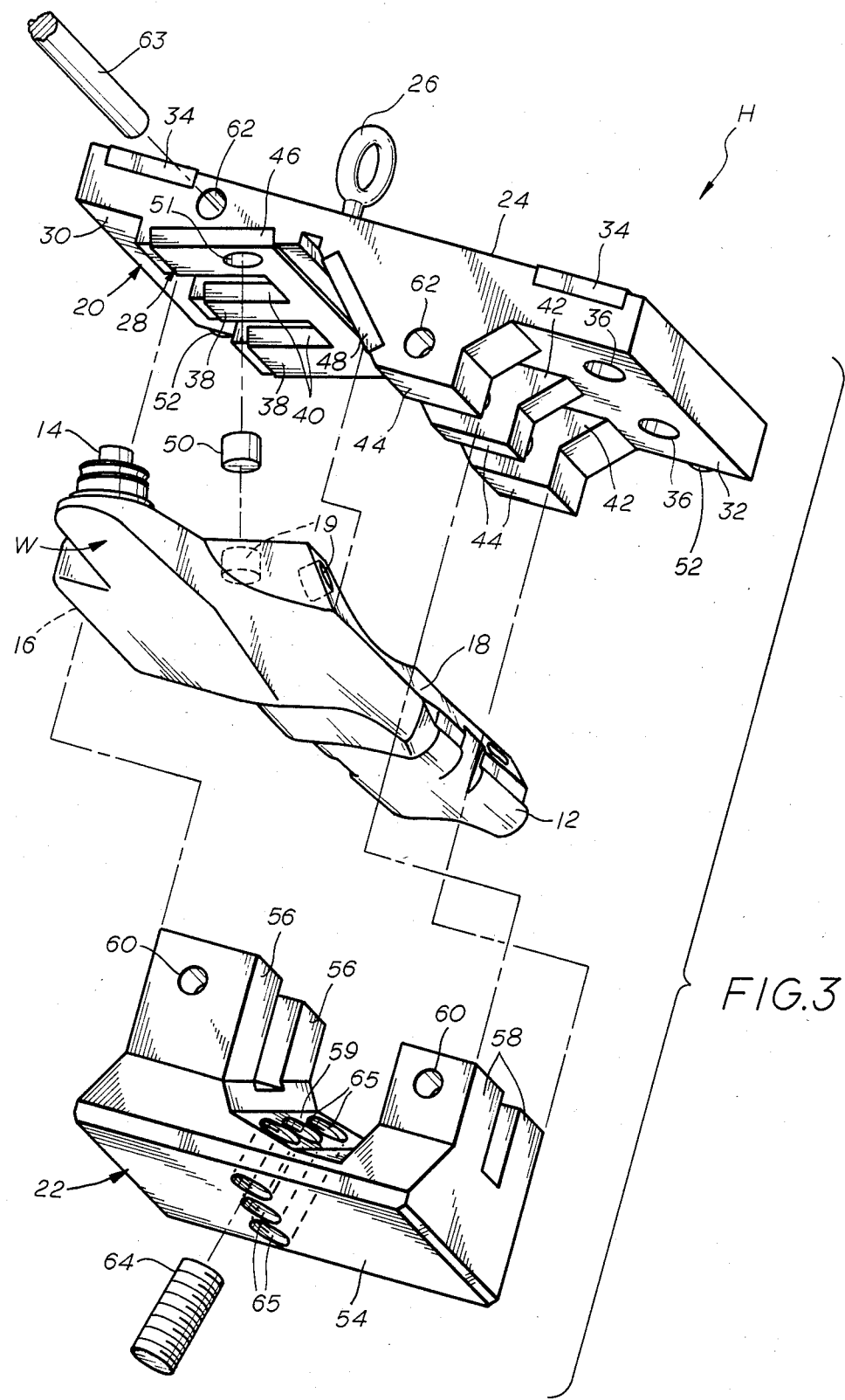
FIG. 3 is an exploded view showing the interfitting body portions of the holder disconnected with a workpiece comprising a rotary drill bit body section shown between the body portions.
Figure 4:
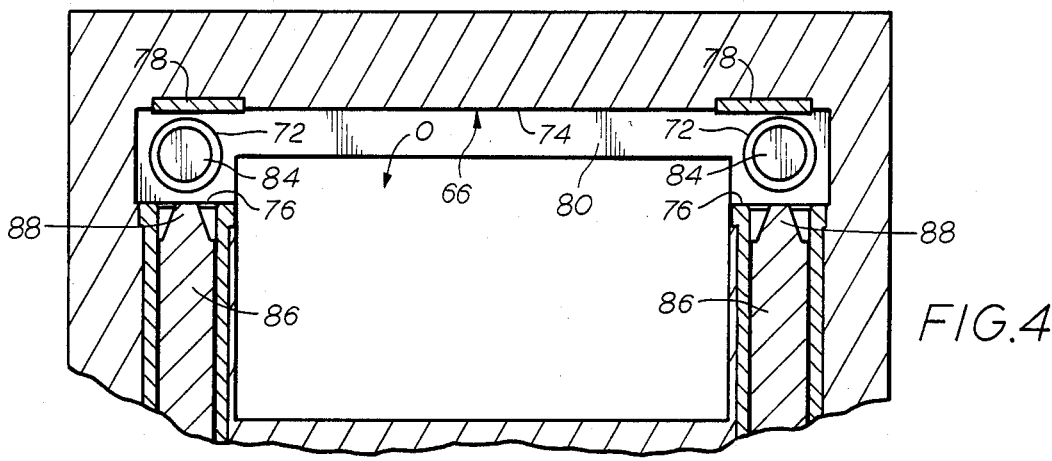
FIG. 4 is a partial section or view of the pocket or opening on the rotary table of the lathe for receiving the holder and workpiece, and illustrating the supporting ledges forming a planar surface for holding the holder thereon.

While the present invention can be employed with various types of workpieces on which a machining operation is to be performed and with various types of metal working apparatus, it is particularly adapted for use with a rotary lathe and a rotary drill bit section. A rotary drill bit is normally formed of three elongated body sections or lugs which are welded together to form the completed drill bit. Workpiece or rotary bit section W as shown particularly in FIG. 3 has a leg or shank 12 with a bearing journal 14 on one end to receive a roller cutter thereon after the machining operation. Leg 12 has two faces 16, 18 arranged at one hundred twenty degrees (120°) with respect to each other which faces serve as reference planes for the precise machining of bearing journal 14. Each face 16, 18 has a generally cylindrical opening 19 therein adapted to receive a dowel pin therein for precise alignment of three interfitting drill bit sections W for welding together along seams formed by contacting faces 16, 18 of adjacent drill bit sections after the machining operation. For positioning bit section W within holder H for the machining operation prior to welding however, only opening 19 in face 16 receives a dowel pin as will be explained further.

Holder H includes a pair of respective upper and lower interfitting body portions generally designated 20 and 22 with workpiece W fitting therebetween. Upper body portion 20 has an upper surface 24 and a lifting eye 26 extending upwardly from surface 24. Irregular lower surface of upper body portion 20 generally designated 28 has a pair of opposed marginal edge surface portions 30, 32 which provide supporting surfaces when holder H is positioned on lathe L. Positioned above marginal edge portions 30, 32 on upper surface 24 are a pair of wear plates 34 extending slightly above upper surface 24 to provide a contact surface for holder H when positioned within lathe L. Each marginal edge portion 30, 32 has a pair of frustro-conical positioning openings 36 therein for positioning holder H within lathe L. Depending lugs 38 adjacent edge portion 30 form slots 40 therebetween. Formed adjacent edge portion 32 are slots 42 defined between end lugs 44. Positioned between lugs 38, 44 are a pair of contact faces 46, 48 positioned in planes at precisely one hundred twenty degrees (120°) to each other and extending slightly below lugs 38, 44. For positioning workpiece or bit body section W accurately, a dowel pin 50 is normally positioned first in opening 19 of face 16, and then bit body section W is positioned between body portions 20, 22 with dowel pin 50 being received within opening 51 in contact face 46. Stops 52 extend from the rear surface of upper body portion 20.

Lower body portion 22 has a lower planar surface 54 and two upwardly projecting lugs 56 on one side for fitting within slots 40 and a pair of upwardly projecting lugs 58 on the other side for fitting within slots 42. The area between lugs 56 and 58 provides space for receiving workpiece W therebetween and a lower inclined bottom surface 59 for supporting workpiece W. Openings 60 in lugs 56, 58 of lower body portion 20 are alignable with openings 62 in lugs 38, 44 upper body portion 20. Pins 63 fit within openings 60, 62 to hold body portions 20 and 22 in interfitting relation. Set screws 64 are threaded within internally threaded openings 65 in lower body portion 22 for contacting and holding workpiece W within holder H in aligned relation.

For initial positioning workpiece W within holder H prior to the machining operation and at a location removed from lathe L, workpiece W may be inserted within holder H with holder body portions 20, 22 in assembled position. First, leg 12 of workpiece W is inserted between body portions 20, 22 with dowel pin 50 received within opening 19 in face 16 and opening 51 in contact face 46 to position workpiece W longitudinally with contact faces 46, 48 in contact with contact faces 16, 18 on leg 12. Then set screws 64 are rotated to contact leg 12 and hold workpiece W in tight gripping relation with bearing journal 14 extending outwardly from holder H. With bit body section W tightly gripped within holder H, preferably at a location removed from lathe L, holder H and bit section W are now ready to be positioned on lathe L for the machining operation. Since holder H is not fixed to lathe L, a number of holders H containing bit section W may be preassembled at any time, as desired, for subsequent positioning on lathe L.

It is to be understood that under some conditions of operation and with certain workpiece shapes, it may be desirable to disassemble body portions 20, 22 first, then reassemble body portions 20, 22 after workpiece W has been properly positioned between the body portions.

For receiving holder H and bit section W, lathe L has a pocket generally designated 0 on rotary table R as shown particularly in FIG. 2. Pocket 0 has a receiving opening or mouth 70 having laterally extending wide mouth portions 72 along opposed sides thereof defined between an upper planar surface 74 and a pair of opposed lower planar surfaces 76 extending in parallel relation to upper planar surface 74. Lower planar surfaces 76 act as and define supporting surfaces or ledges for marginal edge portions 30, 32 of holder H with lower body portion 22 being positioned between planar surfaces 76 and extending downwardly therefrom. Upper planar surface 74 has a pair of spaced upper wear plates 78 therein and extending slightly beyond adjacent surface 74. Wear plates 38 and 78 contact each other in aligned position for the machining operation as will be explained further. The planes in which parallel planar surfaces 74, 76 are located extend downwardly from mouth 70 of pocket 66 and are inclined at an angle of around 30° to 40° with respect to a horizontal plane. The arrangement of such surfaces at an inclined relation with respect to the horizontal permits the easy insertion and removal of holder H and workpiece W by the lathe operator. Pocket 66 also has a rear surface 80 extending between planar surfaces 74, 76 and rear stops 84 extend slightly beyond rear surface 80 to contact stops 52 on upper body portion 20 when holder H is positioned within lathe L as shown in FIG. 7.

A suitable lift mechanism, such as an overhead electrically operated winch has a hook which engages eye 26. The lathe operator guides holder H and workpiece W to receiving opening 70. Since eye 26 is positioned along one side of upper body portion 20, holder H is tilted at an angle when it reaches receiving opening or mouth 70. Then, holder H and bit body section W will easily slide down the inclined pocket 66 along surfaces 76 until stops 52 and 84 engage. As shown in FIG. 1, a suitable counterbalance C is positioned within an opposed pocket on lathe L.

Figure 5:
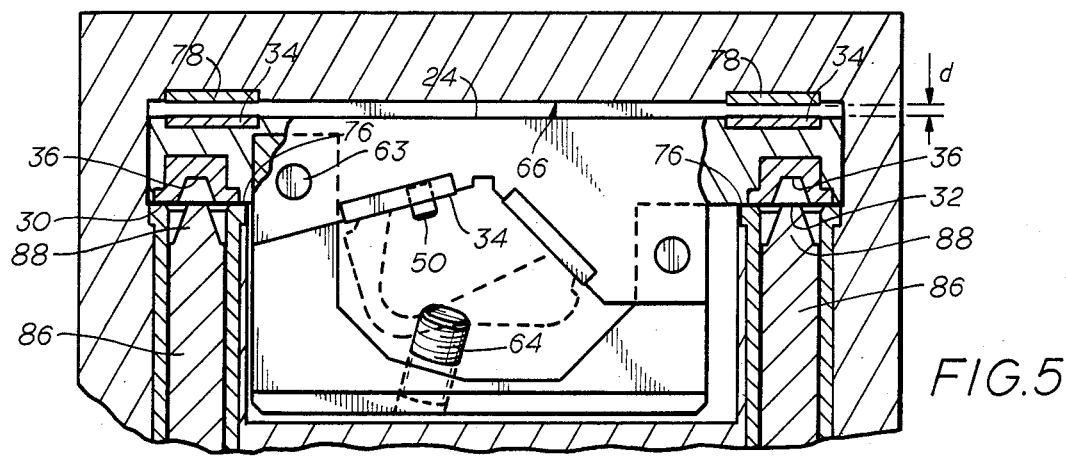
FIG. 5 is a sectional view similar to FIG. 4 but showing the holder and associated workpiece after initial insertion within the pocket with the holder supported on the lower supporting ledges.
Figure 6:
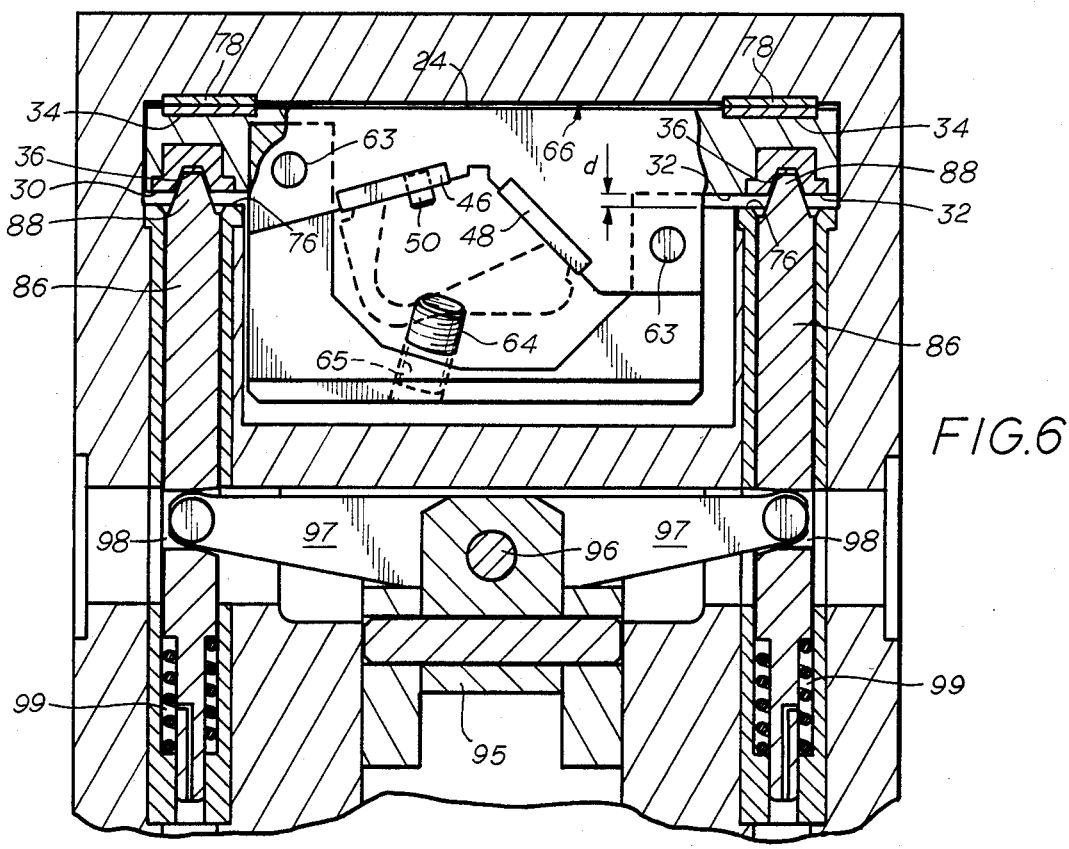
FIG. 6 is a view similar to FIG. 5 but showing the holder and workpiece after pressed upwardly into contact with an upper planar surface defining the pocket for accurate alignment of the holder and workpiece for the machining operation, and also showing means for urging the holder and workpiece into the aligned position.

Mounted on lathe L adjacent pocket 66 for positioning holder H and bit body section W are four pins 86 with a pair of pins 86 provided beneath each marginal edge portion 30, 32. Pins 86 have upper frustro-conical ends 88 for positioning within mating frustro-conical openings 36 which provide sockets for pins 86. To move holder H and bit body section W from the initial position shown in FIG. 5 to an aligned position relative to cutting tool T on lathe L as shown in FIG. 6, contacting wear plates 78 are required to be in abutting contacting relation with mating wear plates 34 on the upper surface of upper body portion 20 which is accomplished by the upward movement of pins 86. The movement of pins 86 is controlled by the lathe operator by supplying hydraulic fluid through line 88 to the lower side of hydraulic cylinder 90. Upward movement of piston 92 pivots a link 93 about point 94. A connecting link 95 is pivoted to link 93, and a connecting pin 96 connects arms 97 to link 95 in fixed relation as shown in FIGS. 6 and 7. The outer ends of arms 97 fit within slots 98 of pins 86 and upward movement of connecting link 95 results in upward movement of pin 96, fixed arms 97, and pins 86. The upward movement of pins 86 press wear plates 34 and 78 into tight contact with each other with surfaces 30, 32 spaced from planar surface 76 a distance d as shown in FIG. 6, and in this position, the bit body section W is accurately and precisely positioned for the machining operation. It is noted from FIG. 5 that wear plates 34 and 78 are spaced a distance d from each other in the initial position. In the event of loss of hydraulic fluid, springs 99 will retain pins 86 in the up position.

To lower pins 86 for release of holder H and workpiece W after the machining operation, hydraulic fluid is supplied to line 100 to move piston 92 and links 93, 99 downwardly to the broken line position shown in FIG. 7. Thus, for removal of holder H and bit body section W after the machining operation, the lathe operator reverses the fluid pressure to cylinder 90 to withdraw pins 86 from openings 36. When pins 86 are lowered, holder H moves downwardly into supporting relation on lower planar surfaces 76 as shown in FIG. 5. In this position, the lathe operator may engage eye 26 with a suitable lift mechanism for removal of holder H and bit body section W from lathe L. After bit body section W has been removed from holder H, three of the body sections W may be accurately positioned for welding into the finished rotary bit in a separate operation.

In operation, with holder H removed from lathe L, a workpiece or bit body section W is first positioned within holder H with positioning pin 50 within an opening 19 and with faces 16, 18 of leg 12 in contact with faces 46, 48. Set screws 64 are then rotated to contact leg 12 and prevent any shifting or tilting of workpiece W.

Next, the lathe operator engages lifting eye 26 with a suitable hook and lifts holder H for movement to lathe L and insertion within pocket 66. As holder H is slightly tilted, pocket 66 easily receives marginal edge portions 30, 32 within the wide mouth portion 72 with lower body portion 32 and workpiece W fitting in the opening between wide mouth portions 72 and bearing journal 14 extending outwardly from holder H. Holder H easily slides downwardly within the inclined pocket along surfaces 76 until stops 52 and 80 contact as shown in FIG. 5. In this position, with holder H fitting loosely within pocket 66 and pins 86 being withdrawn, the lathe operator by suitable controls supplies hydraulic fluid to cylinder 90 through line 88 for moving pins 86 upwardly to engage the frustro-conical shaped openings 36 in upper body portion 20 to move holder H upwardly until wear plates 34 thereon are in tight abutting contact with wear plates 78 along upper planar surface 74 as shown in FIG. 6. In this position, bearing journal 14 is precisely positioned for the machining operation.

After the machining operation by a suitable cutting tool T on lathe L, the lathe operator then reverses the hydraulic fluid pressure to cylinder 90 to withdraw pins 86 from openings 36 and holder H with workpiece W moves downwardly to supporting relation on lower planar surfaces 76 as shown in FIG. 5. In this position with the machining operation completed, the lathe operator then engages lifting eye 26 to lift holder H and rotary bit section W from lathe L. Holder H and bit section W are transported by the lift mechanism to a suitable position for removal of workpiece W from holder H after release of set screws 65. The lathe operator is then ready for the machining of another bit body section W.

From the above, it is apparent that the above described method and apparatus for machining a workpiece, particularly a bit body section, are provided which result in a precise positioning of the bit body section for the machining operation. This is accomplished with a holder for the bit body section being removable from a suitable machining apparatus such as a lathe, and yet even with such a removable holder, the holder is precisely positioned for the machining operation in a minimum of time and with minimal safety hazard to a machine tool operator.

We claim:

1. Apparatus for machining a bearing journal on the end of an elongated drill bit body section mounted on the rotary table of a lathe for rotation about a vertical axis comprising:

a holder adapted to be removed from and installed on said rotary table, said holder including a pair of interfitting body portions removably secured about the bit body section and means for accurately positioning the bit body section within the interfitting body portions at a precise predetermined position with the bearing journal on which the machining is to be performed extending outwardly from the holder;

said rotary table having a generally laterally extending pocket therein defined by a receiving opening adjacent the axis of rotation of said rotary table and upper and lower generally parallel planar surfaces inclined downwardly from said receiving opening so that the holder and bit body section are received within said opening and easily slide into initial position within the pocket supported loosely on said lower planar surface while slightly spaced below said upper planar surface;

releasable securing means on said lathe for engaging said holder and pressing said holder against said upper planar surface in a secured position while spaced slightly above said lower planar surface for accurately positioning said holder and bit body portion within said pocket so that the bearing journal is vertically aligned with the axis of rotation of said rotary table; and a machining tool on the lathe for machining said journal.

2. Apparatus for machining a bearing journal on a lathe as set forth in claim 1 wherein said releasable securing means on said lathe comprises a plurality of pins adjacent said lower planar surface and movable upwardly upon insertion of said holder within said pocket to engage said holder and press said holder against said upper planar surface into a predetermined precise position with said upper planar surface defining a reference plane for the machining operation;

said pins being released upon completion of the machining operation for removal of said holder and bit body section from the lathe.

3. Apparatus for machining a bearing journal on a lathe as set forth in claim 1 wherein one of said pairs of interfitting portions of said holder has a pair of workpiece contact faces thereon arranged at an angle of one hundred twenty degrees (120°) with respect to each other.

4. Apparatus for machining a bearing journal on a lathe as set forth in claim 1 wherein said pocket defined by said downwardly inclined upper and lower generally parallel planar surfaces has a clearance in the range of around one sixteenth inch (1/16) to three eights (⅜) inch between said holder and said planar surfaces.

5. A separate holder for an elongated drill bit body section for removable insertion within a pocket of a rotary turning lathe for machining a bearing journal on said bit body section comprising:

a pair of interfitting body portions removably secured about the bit body section and accurately positioning the bit body section therebetween at a precise predetermined location with the bearing journal on which the machining is to be performed extending outwardly from the holder;

one of said body portions being an upper body portion for positioning adjacent a machining tool on the lathe and the other body portion being a lower body portion remote from said machining tool;

said upper body portion having a planar upper surface, a pair of spaced lower planar surfaces along opposed lower marginal edge portions of said upper body portion defining ledges for supporting said holder on said lathe, at least one depending lug adjacent each of said marginal edge portions, and a pair of workpiece contact faces on the lower surface of the upper body portion between the supporting ledges and the lugs, said contact faces being arranged at an angle of one hundred twenty degrees (120°) with respect to each other for contacting said drill bit body section along faces thereof arranged at one hundred twenty degrees (120°) with respect to each other;

said lower body portion having at least a pair of lugs interfitting with said lugs on said upper body portion and spaced from each other to define a supporting surface therebetween for contacting and supporting the drill bit body section thereon; and means releasably connecting said lugs on said upper and lower body portions to each other at a precise location with the drill bit body section gripped therebetween in contact with said contact faces on the upper body portion and said supporting surface on said lower body portion for accurately positioning of the bearing journal for machining.

6. A method for machining a workpiece mounted on the rotary table of a lathe for rotation about a vertical axis comprising the steps of:

first gripping the workpiece accurately at a location removed from the lathe between two mating portions of a removable workpiece holder in a predetermined position with a portion of the workpiece on which the machining is to be performed extending outwardly from the holder;

next inserting the holder with the workpiece accurately gripped therein within a generally laterally extending downwardly inclined pocket of the rotary table positioned adjacent the axis of rotation thereof so that the holder and workpiece easily slide into position within the pocket aided by gravity;

then securing the holder and workpiece accurately at a predetermined location within the pocket so that the extending portion of the workpiece is positioned precisely with respect to the axis of rotation of said rotary table for machining by a machining tool on the lathe; and next machining the journal by said machining tool upon rotation of said rotary table.

7. A method for machining a bearing journal on the end of an elongated drill bit body section mounted on the rotary table of a lathe for rotation about a vertical axis comprising the steps of:

first positioning the elongated bit body section in a tightly clamped relation accurately at a predetermined position within a holder removed from the lathe with the bearing journal on which the machining is to be performed extending outwardly from the holder;

next inserting the holder with the bit body section accurately gripped therein within a generally laterally externally extending pocket on the rotary table adjacent the axis of rotation thereof and defined by downwardly inclined upper and lower generally parallel planar surfaces so that the holder and clamped bit body section easily slide by gravity into initial position within the pocket between said planar surfaces supported on said lower planar surface but spaced slightly below said upper planar surface;

then releasably securing and positioning said holder in the pocket against said upper planar surface while spaced slightly above said lower planar surface for accurately positioning the holder and bit body portion within the pocket so that said journal is in vertical alignment with the axis of rotation of said rotary table for machining by a machining tool on the lathe; and next machining the journal with the machining tool upon rotation of said rotary table.

8. The method for machining a bearing journal as set forth in claim 7 and further including the steps of:

releasing the securing means for holding the holder in the pocket against said upper planar surface after the journal has been machined so that the holder and bit body section rest loosely on the lower planar surface; and then removing the holder and finished bit journal from the rotary table for subsequent disassembly.

* * * * *